(12) United States Patent
Uchida et al.

(10) Patent No.: US 8,147,783 B2
(45) Date of Patent: Apr. 3, 2012

(54) NICKEL HYDROXIDE POWDER AND METHOD FOR PRODUCING SAME

(75) Inventors: Yoshio Uchida, Ibaraki (JP); Seiji Tsuji, Kyoto (JP); Ren-De Sun, Shiga (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 399 days.

(21) Appl. No.: 11/574,519

(22) PCT Filed: Oct. 26, 2005

(86) PCT No.: PCT/JP2005/020058
§ 371 (c)(1),
(2), (4) Date: Mar. 1, 2007

(87) PCT Pub. No.: WO2006/046752
PCT Pub. Date: May 4, 2006

(65) Prior Publication Data
US 2007/0292758 A1    Dec. 20, 2007

(30) Foreign Application Priority Data
Oct. 27, 2004    (JP) .................... 2004-311932

(51) Int. Cl.
C01G 53/04    (2006.01)
(52) U.S. Cl. .......... 423/140; 423/138; 423/594.3
(58) Field of Classification Search .......... 423/594.3, 423/592.1
See application file for complete search history.

(56) References Cited

U.S. PATENT DOCUMENTS

| | | | |
|---|---|---|---|
| 4,853,090 A * | 8/1989 | Daniel et al. ............... | 205/781.5 |
| 5,278,106 A | 1/1994 | Nakashima et al. | |
| 5,700,596 A | 12/1997 | Ikoma et al. | |
| 5,744,337 A * | 4/1998 | Price et al. ............... | 435/178 |
| 6,197,273 B1 | 3/2001 | Nagano et al. | |
| 6,592,645 B1 * | 7/2003 | Mizutani et al. ............... | 75/365 |
| 2002/0037455 A1 * | 3/2002 | Tani et al. ............... | 429/223 |
| 2004/0256750 A1 * | 12/2004 | Yamada et al. ............... | 264/14 |

FOREIGN PATENT DOCUMENTS

| | | |
|---|---|---|
| EP | 0 481 892 A1 | 4/1992 |
| EP | 1 013 610 A1 | 6/2000 |
| JP | 59016269 A * | 1/1984 |
| JP | 02-095433 | 4/1990 |
| JP | 4-154605 A | 5/1992 |
| JP | 07-130365 | 5/1995 |
| JP | 7-245104 A | 9/1995 |
| JP | 8-002416 | 1/1996 |
| JP | 10-25117 A | 1/1998 |
| JP | 10-87332 A | 4/1998 |
| JP | 10-237311 A | 9/1998 |
| JP | 10-265225 A | 10/1998 |
| JP | 2001-85009 A | 3/2001 |
| JP | 2003-301047 A * | 10/2003 |

OTHER PUBLICATIONS

Zhao, Li et al., "Preparation of Nano-Scale Nickel Hydroxide for Alkaline Batteries", Battery Bimonthly, vol. 30, No. 6, Dec. 2000.

* cited by examiner

*Primary Examiner* — Jerry Lorengo
*Assistant Examiner* — Jared Wood
(74) *Attorney, Agent, or Firm* — Sughrue Mion, PLLC

(57) ABSTRACT

Disclosed are a nickel hydroxide powder and a method for producing the same. The nickel hydroxide powder comprises a particle in the form of sphere, an average particle diameter of 0.1 μm or more and 30 μm or less, and the amount of the particles having a diameter of 0.7 times or more and 1.3 times or less the average particle diameter of 80% by weight or more based on the total amount of particles. The method for producing a nickel hydroxide powder comprises the steps of (1) to (4): (1) injecting a solution containing a nickel salt through a pore into a liquid mutually insoluble with the solution to obtain an emulsion including solution as a dispersed phase and the liquid as a continuous phase; (2) gelating the emulsion; (3) separating the dispersed phase from the obtained gel to obtain a cake; and (4) drying the cake.

8 Claims, 2 Drawing Sheets

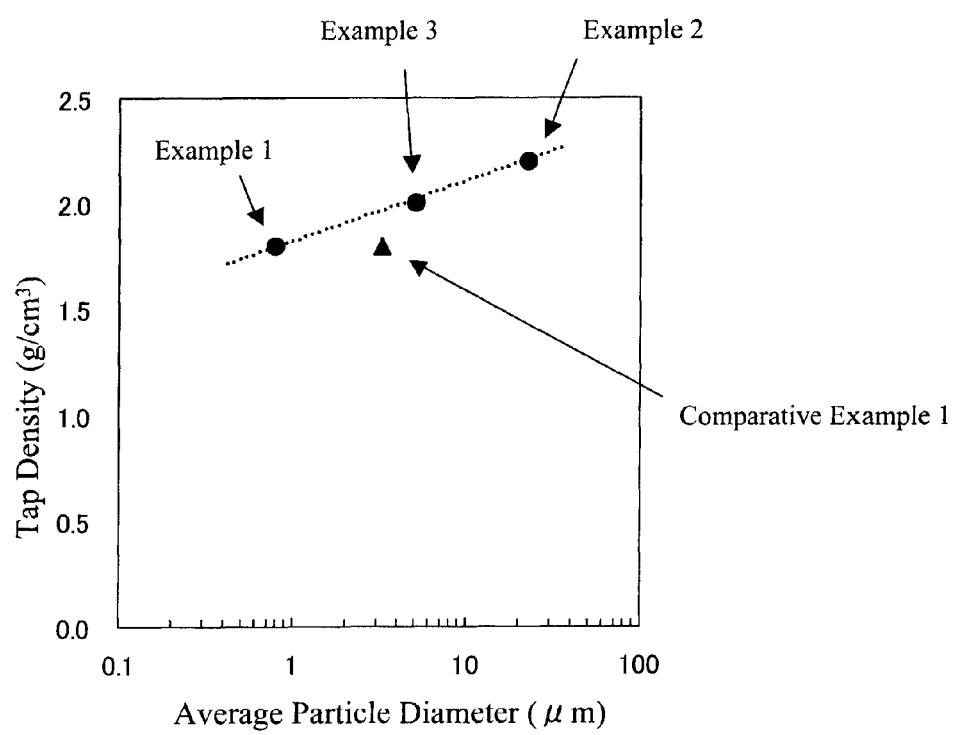

NICKEL HYDROXIDE POWDER AND METHOD FOR PRODUCING SAME

TECHNICAL FIELD

The present invention relates to a nickel hydroxide powder and a method for producing the same.

BACKGROUND ART

A nickel hydroxide powder is used as a cathode active material for a nickel cadmium (Ni—Cd) battery and a nickel metal hydride (Ni-MH) battery. The nickel hydroxide powder is also used as a material for producing a lithium nickel oxide cathode active material of lithium-ion secondary battery.

Such secondary batteries are required to be down sized and enhance the capacity thereof. The cathode active materials (nickel hydroxide, lithium nickel oxide) are desired to be packed in high density in view of down-sizing the batteries and enhancing the capacity thereof, therefore a nickel hydroxide powder with a high tap density is required.

DISCLOSURE OF THE INVENTION

The object of the present invention is to provide a nickel hydroxide powder with a high tap density and a method for producing the same.

The present inventors have studied a nickel hydroxide powder of which tap density is higher than that of another nickel hydroxide powder on the basis of the same average particle diameter, and a method for producing such nickel hydroxide powder, and achieved the present invention.

That is, the present invention provides a nickel hydroxide powder comprising a particle in the form of sphere, an average particle diameter of 0.1 μm or more and 30 μm or less, and the amount of the particles with a particle diameter of 0.7 times or more and 1.3 times or less the average particle diameter of 80% by weight or more based on the total amount of particles.

Further, the present invention provides a method for producing a nickel hydroxide powder comprising the steps of (1) to (4):

(1) injecting a solution containing a nickel salt through a pore into a liquid mutually insoluble with the solution to obtain an emulsion including the solution as a dispersed phase and the liquid as a continuous phase;

(2) gelating the emulsion to obtain a gel;

(3) separating the dispersed phase from the gel to obtain a cake; and (4) drying the cake.

Furthermore, the present invention provides a method for producing a mixture of nickel hydroxide powders comprising mixing at least two powders selected from the nickel hydroxide powders having different average particle diameters; wherein, when a nickel hydroxide powder having the average particle diameter being ranked at nth in ranking the average particle diameters of the nickel hydroxide powders in the descending order is referred to as $A_n$, and a nickel hydroxide powder having the average particle diameter being ranked subsequently just behind the $A_n$ is referred to as $A_{n+1}$, a ratio $(DA_{n+1}/DA_n)$ of an average particle diameter $DA_{n+1}$ of the $A_{n+1}$ to an average particle diameter $DA_n$ of the $A_n$ is 0.1 to 0.3, and a ratio $(WA_{n+1}/WA_n)$ of a weight $WA_{n+1}$ of the $A_{n+1}$ to a weight $WA_n$ of the $A_n$ is 0.1 to 1.0.

BRIEF DESCRIPTION OF DRAWINGS

FIG. 2 shows relations between the average particle diameter and tap density of nickel hydroxide powders obtained in Examples 1 to 3 and Comparative Example 1.

BEST MODE FOR CARRYING OUT THE INVENTION

Nickel Hydroxide Powder

Figure 1:
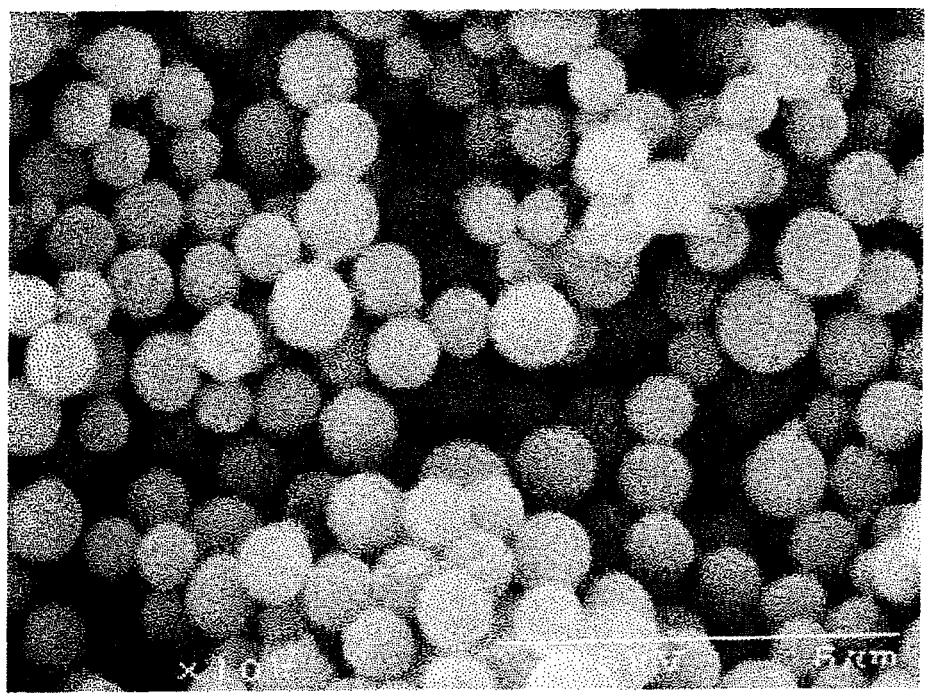
FIG. 1 shows the nickel hydroxide powder obtained in Example 1.

The nickel hydroxide powder of the present invention includes a particle in the form of sphere. The shape of the particle may be determined as follows: taking a photo of nickel hydroxide powder with an electron scanning microscope (hereinafter, referred to as SEM) or transmission electron microscope (hereinafter, referred to as TEM), and measuring a maximum diameter and minimum diameter of a particle on the photo. For example, the shape of the particle which has a ratio between the maximum diameter and minimum diameter of 1.0 or more and 1.1 or less, is defined spherical.

The nickel hydroxide powder has an average particle diameter of 0.1 μm or more, preferably 0.3 μm or more; and 30 μm or less, preferably 15 μm or less.

The nickel hydroxide powder has a specific particle distribution that the amount of particles having a diameter of 0.7 times or more and 1.3 times or less the average particle diameter is 80% by weight or more, preferably 90% by weight or more. The average particle diameter and particle distribution may be determined as follows: taking a photo of a nickel hydroxide powder with a SEM or TEM, optionally selecting particles on the photo (for example, 100 to 1000 particles), and evaluating the selected particles with an image analysis.

Method for Producing Nickel Hydroxide Powder

The method for producing the nickel hydroxide powder of the present invention comprises a step (1) of injecting a solution containing a nickel salt through a pore into a liquid mutually insoluble with the solution to obtain an emulsion including the solution as a dispersed phase and the liquid as a continuous phase.

The solution containing a nickel salt is a dispersed phase, which is obtained by dissolving the nickel salt in a solvent. Examples of the solvent include organic solvents and aqueous solvents, and preferably aqueous solvents. Examples of the nickel salt include nickel oxalate, nickel acetate, nickel formate, nickel chloride, and nickel nitrate. The solution containing the nickel salt may contain a dispersant. When the solution containing the nickel salt is aqueous, examples of the dispersant include polycarboxylic acid or ammonium salt of the polycarboxylic acid, or polyacrylic acid or ammonium salt of the polyacrylic acid.

The liquid is mutually insoluble with the solution containing the nickel salt. When the solvent of the solution containing the nickel salt is aqueous, examples of the liquid include non-water-soluble organic solvents such as toluene, cyclohexane, kerosene, hexane, and benzene. The liquid may contain a surfactant. Examples of the surfactant include sorbitan esters such as sorbitanmonolaurate; and glycerin esters.

In the step (1), injecting a solution containing a nickel salt through a pore into a liquid provides an emulsion. Varying an average diameter of the pores passing the solution containing a nickel salt therethrough changes an average particle diameter of the nickel hydroxide powder to be obtained. The pores passing the solution containing a nickel salt may have a pore diameter to obtain a nickel hydroxide having a desired average particle diameter; for example, when producing a nickel hydroxide powder having an average particle diameter of 0.1 μm or more and 30 μm or less, an average pore diameter is preferably 0.1 μm or more and 40 μm or less.

Furthermore, a preferable pore diameter distribution is that the amount of pores having a diameter of 0.7 times or more and 1.3 times or less the average pore diameter is 80% or more based on the total amount of pores.

The pore may be provided from a nozzle, porous film, and porous material having a continuous space. In view of efficiency and strength, the porous material is preferable. When the porous material is used, the porous material may have relatively uniform pore diameter, for example, Shirasu Porous Glass (hereinafter, referred to as SPG), and may be a porous glass, and porous ceramic. In view of precisely controlling the pore diameter, SPG is preferable.

When a W/O emulsion (including water as a dispersed phase and organic solvent as a continuous phase) is prepared, it is preferable the surface of the porous material contacting a liquid (organic solvent) is oleophilic. It is more preferable the whole surfaces of the pores in the porous material are oleophilic. When a hydrophilic porous material (for example, SPG) is used, a treatment for making it oleophilic may be conducted. The treatment may be conducted with methods, for example, of dipping a porous material in a silicone resin followed by drying, coating a silane coupling agent on a porous material, and contacting a silane (for example, trimethylchlorosilane) with a porous material.

In the step of injecting a solution containing a nickel salt through a pore into a liquid, the solution containing a nickel salt is preferably left from the pore promptly. For example, the porous material is preferably vibrated. The liquid is preferably fluidized. The fluidizing the liquid may be conducted with agitation or external circulation.

In the step (1) an emulsion including the solution containing a nickel salt as a dispersed phase and the liquid as a continuous phase is obtained. For example, when the dispersed phase is an aqueous solvent and the continuous phase is an organic solvent, a water/oil (W/O) emulsion is obtained.

The method for producing the nickel hydroxide powder includes a step (2) of gelating the emulsion obtained in the step (1).

The gelation, for example, may be conducted by addition of gellant. Examples of the gellant include ammonium chloride, ammonium bicarbonate, sodium hydroxide, and sodium carbonate, and preferably ammonium chloride and ammonium bicarbonate. The amount of the gellant is usually 0.1 mole equivalents or more, preferably 1 mole equivalent or more; and usually 10 mole equivalents or less, preferably 7 mole equivalents or less based on nickel ions contained in the emulsion.

The gellant may be added by a method of mixing an aqueous solution of a gellant with an emulsion; a method of dissolving a gellant in a liquid (continuous phase) before emulsion and then injecting a solution containing a nickel salt to the resultant; and dispersing a gellant in an emulsion. In the method of dispersing a gellant in an emulsion, in view of uniformly dispersing the gellant, the dispersion is preferably conducted after emulsifying the gellant. Emulsification may, for example, be conducted by membrane emulsification, or using ultrasonic homogenizers, and agitation-type homogenizers.

The method for producing the nickel hydroxide powder includes a step (3) of separating the dispersed phase from the gel obtained in the step (2) to obtain a cake.

The separation may be conducted by filtration, decantation, centrifugal separation, preferably filtration, decantation. The filtration or decantation prevent the particles of the dispersed phase from agglomerating each other or deforming.

In the method for producing the nickel hydroxide powder, the cake may be washed after separation. The washing may be conducted, for example, with water. When the gellant contains alkali, an alkali metal (for example, Na) in the cake (nickel hydroxide), which is brought from the gellant containing the alkali, is removed by washing. By the effect of the gellant, the cake (nickel hydroxide) retains its own shape.

The method for producing the nickel hydroxide powder includes a step (4) of drying the cake obtained in the step (3).

The drying, for example, may be conducted using hot-air dryer, fluidized-bed dryer. The fluidized-bed drying is preferably conducted under conditions of not breaking the nickel hydroxide particles.

In the above method, a nickel hydroxide powder having fewer coarse particles is obtained, because a particle diameter of the nickel hydroxide powder is controlled according to a particle diameter of the dispersion of the emulsion formed by passing through the pore. Furthermore, in the method, as a pore diameter distribution of the pores is narrowed, a nickel hydroxide powder having a narrower particle distribution is obtained.

The nickel hydroxide powder may contain agglomerate particles which are formed during the drying step. However, since such agglomerate particles are weakly bonding each other, they are deagglomerated using jet mills and ball mills (media: light balls made of plastics).

Use of Nickel Hydroxide Powder as a Cathode Active Material

The nickel hydroxide mentioned above is used as a cathode active material for a Ni—Cd battery and a Ni-hydride battery. The nickel hydroxide is also used as a cathode active material for a lithium-ion second battery (lithium nickel oxide; a material such as lithium nickel manganese lithium cobalt oxides in which the nickel of the lithium nickel oxide is substituted with other transition metal, aluminum, zinc, tin, gallium, magnesium, calcium).

The lithium nickel oxide, for example, may be produced by calcining a mixture of the nickel hydroxide powder and a lithium salt. The mixture of the nickel hydroxide powder and a lithium salt may be prepared by a method of adding a solution of lithium salt to the above cake (nickel hydroxide); a method of adding a lithium salt in a solution containing a nickel salt to form a mixture, and then injecting the mixture in a solvent through a pore; and a method of injecting a solution containing a nickel salt through a pore in a solvent added with a lithium salt. Examples of the lithium salt include nitrate, chloride, sulfate, bicarbonate, and oxalate.

The calcination may be conducted usually at 600 to 800° C. for 2 to 10 hours. The calcination may be conducted under oxygen, nitrogen containing oxygen (for example, air), argon containing air. When producing a cathode active material for lithium-ion secondary battery, the calcination is preferably conducted in the presence of oxygen.

The material in which the nickel of the lithium nickel oxide is substituted with other transition metal, aluminum, zinc, tin, gallium, magnesium, or calcium, for example, may be prepared by calcining a mixture of the nickel hydroxide powder and a salt containing transition metal, aluminum, zinc, tin, gallium, magnesium, or calcium. Examples of the salt containing transition metal include nitrate, chloride, sulfate, bicarbonate, oxalate. In this case, the calcination may be conducted usually at 700 to 1100° C. for 2 to 10 hours. The calcination preferably conducted under nitrogen containing oxygen (for example, air).

The above lithium nickel oxide or the material in which the nickel of the lithium nickel oxide is substituted with other transition metal, aluminum, zinc, tin, gallium, magnesium, calcium, usually includes a particle in the form of sphere and narrow particle distribution as well as the nickel hydroxide, and for example the amount of the particles having a particle diameter of 0.7 times or more and 1.3 times or less than an average particle diameter is 90% by weight or more based on the total amount of particles. These materials may contain agglomerate particles which are formed during the calcination step. However, since such agglomerate particles are weakly bonding each other, they are deagglomerated using a jet mill and ball mill (medium: light balls made of plastics).

Using the lithium nickel oxide or the material in which the nickel of the lithium nickel oxide is substituted with other transition metal, a cathode active material having a high packed density is obtained. Furthermore, the material may be mixed with other material having a different average particle diameter therefrom. The mixing provides a cathode active material having a higher packed density and increases an actual quantity per unit volume of the cathode active material. A battery increases its electric capacity as the quantity of the cathode active material increases.

Method for Producing a Mixture of Nickel Hydroxide Powders

The method for producing a mixture of the nickel hydroxide powders according to the present invention includes a step of mixing at least two powders having different average particle diameters.

The nickel hydroxide powders are selected from the nickel hydroxide powder mentioned above. The nickel hydroxide powders includes a particle in the form of sphere. The amount of the particles having a diameter of 0.7 times or more and 1.3 times or less than an average particle diameter is 80% by weight or more, preferably 90% by weight or more based on the total amount of particles.

The nickel hydroxide powders to be mixed have an average particle diameters of 0.1 μm to 30 μm, and average particle diameters thereof are different each other. When a nickel hydroxide powder having the average particle diameter being ranked at nth in ranking the average particle diameters of the nickel hydroxide powders in the descending order is referred to as $A_n$, and a nickel hydroxide powder having the average particle diameter being ranked subsequently just behind the $A_n$ is referred to as $A_{n+1}$ (n is natural number), a ratio ($DA_{n+1}/DA_n$) of an average particle diameter $DA_{n+1}$ of the $A_{n+1}$ to an average particle diameter $DA_n$ of the $A_n$ is 0.1 to 0.3. And, a ratio ($WA_{n+1}/WA_n$) of a weight $WA_{n+1}$ of the $A_{n+1}$ to a weight $WA_n$ of the $A_n$ is 0.1 to 1.0.

For example, a mixed powder of nickel hydroxides is produced by mixing 72 parts by weight of nickel hydroxide powder $A_1$ having an average particle diameter of 23 μm, and amount of the particles having a diameter of 0.7 times or more and 1.3 times or less than the average particle diameter of 93% by weight based on the total amount of particles;

15 parts by weight of nickel hydroxide powder $A_2$ having an average particle diameter of 5.1 μm, and amount of the particles having a diameter of 0.7 times or more and 1.3 times or less than the average particle diameter of 89% by weight based on the total amount of particles; and 13 parts by weight of nickel hydroxide powder $A_3$ having an average particle diameter of 0.8 μm, and amount of the particles having a diameter of 0.7 times or more and 1.3 times or less than the average particle diameter of 84% by weight based on the total amount particles.

In this example, the ratios of the average particle diameters $DA_2/DA_1$ is 0.02, and $DA_3/DA_2$ is 0.16, and the ratios of the weights $WA_2/WA_1$ is 0.21, and $WA_3/WA_2$ is 0.87.

In this example, between (gaps) the particles of the nickel hydroxide powder having the large average particle diameter (for example, about 20 μm), the nickel hydroxide powder having the medium average particle diameter (for example, about 5 μm) slip into. Thereby, mixing 100 parts by weight of a nickel hydroxide powder having a large average particle diameter and 30 parts by weight of a nickel hydroxide powder having a medium average particle diameter, increases a tap density of the nickel hydroxide powder mixture to be obtained.

To further increase the tap density, a nickel hydroxide powder having much smaller average particle diameter (for example, about 0.5 μm to about 0.8 μm) may be mixed. The nickel hydroxide powder having a much smaller average particle diameter may slip into between the particles of the nickel hydroxide powder having the medium average particle diameter. Mixing 100 parts by weight of the nickel hydroxide powder having the large average particle diameter, 30 parts by weight of the nickel hydroxide powder having the medium average particle diameter, and 10 parts by weight of the nickel hydroxide powder having a much smaller average particle diameter, increases a tap density of the nickel hydroxide powder mixture to be obtained. Selecting any of average particle diameters of the nickel hydroxide powders and mixing ratios allow to fill up to about 70% by volume or more, and to obtain a nickel hydroxide powder mixture having the tap density of about 2.5 g/cm$^3$ [=density of nickel hydroxide (about 3.65 g/cm$^3$)×70%].

The mixing, for example, may be conducted using V-shaped mixer, shaking mixer, ball mill (medium: plastic ball) and the like under conditions to keep the spherical shape of the nickel hydroxide powder.

EXAMPLES

The present invention will be explained according to Examples, but should not be construed to be limited thereto.

Powder Shape

A photo of a nickel hydroxide powder was taken using a SEM (T-300 type, manufactured by JEOL Ltd.,) and a TEM (JEM40000FX type, manufactured by JEOL Ltd.,), and then maximum and minimum diameters of the particles on the photo were measured. The shape of the particle of which ratio between the maximum diameter and minimum diameter is 1.0 or more and 1.1 or less, is defined spherical.

Average Particle Diameter (μm), Particle Distribution

A photo of a nickel hydroxide powder was taken using a SEM, and appropriate number of particles (10 to 1000 particles) were selected to calculate particle diameters thereof with an image analysis, thereby a particle distribution and average particle diameter were determined. In this evaluation, if 2 or more spherical particles were weakly agglomerated (in the photo, the case of 2 or more spherical particles are overlapping each other), a particle diameter was measured by not assuming the agglomerate particle as a single particle but by dividing the agglomerate to respective particles to measure each particle diameter, and then the average particle diameter and particle distribution were determined.

Tap Density (g/cm$^3$)

According to JIS R1600, a tap density (also called as packed density) was determined.

Example 1

After preparing 15% by weight of aqueous nickel acetate solution by dissolving nickel acetate (manufactured by Wako Pure Chemical Industries, Ltd.) in water, 11 mL of the aqueous nickel hydroxide solution was injected with pressured air of 3 kg/cm$^2$ through the pores of a porous material (SPG) wherein the SPG was sealed with an O ring at the outside of the circumferential parts (both ends) thereof to prevent mixing of the solution and a dispersed phase (appearance: tube, length: 10 cm, thickness: 1 mm, average pore diameter: 0.7 μm, the surface thereof being oleophilic by dipping SPG in an anhydrous toluene solution of trimethylchlorosilane) in 400 mL of toluene containing 1% by weight of a surfactant (the trade name: "tween80", sorbitanmonolaurate) to prepare an emulsion having the aqueous nickel acetate solution as a dispersed phase and the toluene as a continuous phase.

The emulsion was mixed with a gellant (an emulsion prepared by dispersing an aqueous sodium carbonate solution in 800 mL of toluene using a homogenizer), and then gelated. The amount of the gellant (sodium carbonate) was 4.6 mole equivalents based on the nickel hydroxide.

The gel was filtrated to obtain a cake. The cake was dried at 110° C., and then deagglomerated using a ball mill (medium: plastic ball) for 2 hours to obtain a nickel hydroxide powder. The SEM image of the nickel hydroxide powder was shown in FIG. 1. The nickel hydroxide powder had a particle in the form of sphere, average particle diameter of 0.8 μm, amount of the particles having a diameter of 0.7 times to 1.3 times the average particle diameter of 84% by weight, and tap density of 1.8 g/cm$^3$. The relation between the average particle diameter and the tap density was shown in FIG. 2.

Example 2

Except that a SPG having an average pore diameter of 25 μm was used and deagglomeration was not conducted in Example 1, with the same manner, a nickel hydroxide powder was obtained.

The nickel hydroxide powder had a particle in the form of sphere, average particle diameter of 23 μm, amount of the particles having a diameter of 0.7 times to 1.3 times the average particle diameter of 93% by weight, and tap density of 2.2 g/cm$^3$.

Example 3

Except that a SPG having an average pore diameter of 5 μm was used and deagglomeration was conducted for 1 hour in Example 1, with the same manner, a nickel hydroxide powder was obtained.

The nickel hydroxide powder had a particle in the form of sphere, average particle diameter of 5.1 μm, amount of the particles having a diameter of 0.7 times to 1.3 times the average particle diameter of 89% by weight, and tap density of 2.0 g/cm$^3$.

Comparative Example 1

After mixing toluene with 15% by weight of aqueous nickel acetate solution prepared by dissolving nickel acetate (manufactured by Wako Pure Chemical Industries, Ltd.) in water, the mixture was gelated. The gel was filtrated to obtain a cake. The cake was dried at 110° C., and deagglomerated using a ball mill (medium: plastic ball) for 2 hours to obtain a nickel hydroxide powder.

The nickel hydroxide powder had no particles in the form of sphere, and average particle diameter of 3.2 μm, amount of the particles having a diameter of 0.7 times to 1.3 times the average particle diameter of 46% by weight, and tap density of 1.8 g/cm$^3$.

Test 1

The following powders were mixed to obtain a nickel hydroxide powder mixture:

72 parts by weight of the nickel hydroxide powder (average particle diameter: 25 μm) obtained in Example 2, 15 parts by weight of the nickel hydroxide powder (average particle diameter: 5.1 μm) obtained in Example 3, and 13 parts by weight of the nickel hydroxide powder (average particle diameter: 0.8 μm) obtained in Example 1. The nickel hydroxide powder mixture had a tap density of 2.5 g/cm$^3$.

INDUSTRIAL APPLICABILITY

The present invention provides a nickel hydroxide powder of which tap density is higher than that of another nickel hydroxide powder on the basis of the same average particle diameter. Using the nickel hydroxide powder as a cathode active material, a secondary battery (nickel cadmium battery and nickel metal hydride battery) having a larger electric capacity is obtained.

The invention claimed is:

1. A method for producing a nickel hydroxide powder comprising the steps of (1) to (4):
   (1) injecting a solution containing a nickel salt through a pore into a liquid mutually insoluble with the solution to obtain an emulsion including solution as a dispersed phase and the liquid as a continuous phase;
   (2) gelating the emulsion by addition of a gellant;
   (3) separating the dispersed phase from the obtained gel to obtain a cake; and
   (4) drying the cake,
   wherein the addition of a gellant is conducted after emulsifying the gellant.

2. The method according to claim 1, wherein the pore has an average pore diameter of 0.1 μm or more and 40 μm or less.

3. The method according to claim 1, wherein the pore is selected from the group consisting of nozzle, porous film, and porous material having a continuous pore.

4. The method according to claim 1, wherein the pore is porous material having a continuous pore, and the surface of the porous material is oleophilic.

5. The method according to claim 1, wherein the gellant is ammonium chloride, ammonium bicarbonate, sodium hydroxide, or sodium carbonate.

6. The method according to claim 1, wherein the gellant is sodium carbonate.

7. The method according to claim 1, wherein the nickel salt is selected from the group consisting of nickel oxalate, nickel acetate, nickel formate, nickel chloride, and nickel nitrate.

8. The method according to claim 1, wherein the nickel salt is nickel acetate.

* * * * *